United States Patent
Lin et al.

(10) Patent No.: US 8,902,239 B2
(45) Date of Patent: Dec. 2, 2014

(54) VIDEO-PROCESSING CHIP, AUDIO-VIDEO SYSTEM AND RELATED METHOD CAPABLE OF SAVING POWER

(75) Inventors: Meng-Fu Lin, Kao-Hsiung (TW); Ying-Yuan Tang, Taipei County (TW); Wei-Chih Huang, Taipei (TW)

(73) Assignee: Princeton Technology Corporation, Xindian Dist., New Taipei (TW)

( * ) Notice: Subject to any disclaimer, the term of this patent is extended or adjusted under 35 U.S.C. 154(b) by 2330 days.

(21) Appl. No.: 11/686,914

(22) Filed: Mar. 15, 2007

(65) Prior Publication Data
US 2007/0216692 A1   Sep. 20, 2007

(30) Foreign Application Priority Data
Mar. 17, 2006 (TW) ............................... 95109328 A

(51) Int. Cl.
*G06F 13/14* (2006.01)
*G06F 1/32* (2006.01)

(52) U.S. Cl.
CPC ........................................ *G06F 1/32* (2013.01)
USPC .......................................... 345/519; 345/520

(58) Field of Classification Search
USPC ................... 345/519, 520, 472, 472.1, 472.2; 713/300–340
See application file for complete search history.

(56) References Cited

U.S. PATENT DOCUMENTS

| 7,039,819 B1 * | 5/2006 | Kommrusch et al. ......... 713/322 |
| 7,050,049 B2 * | 5/2006 | Byun ............................ 345/211 |
| 7,562,242 B2 * | 7/2009 | Hori ............................... 713/324 |

* cited by examiner

*Primary Examiner* — Hau Nguyen
(74) *Attorney, Agent, or Firm* — Winston Hsu; Scott Margo

(57) ABSTRACT

A video-processing chip capable of saving power is disclosed. The video-processing chip includes a microprocessor, a scalar, a first memory, and a second memory. The microprocessor is used for executing program codes. The scalar is used for adjusting a size of a received image. The first memory is coupled to the microprocessor and to the scalar for providing memory space to the scalar for image processing. The second memory is coupled to the microprocessor for storing the program codes of the microprocessor for controlling a power switch. Wherein a size of the first memory is greater than a size of the second memory.

31 Claims, 6 Drawing Sheets

VIDEO-PROCESSING CHIP, AUDIO-VIDEO SYSTEM AND RELATED METHOD CAPABLE OF SAVING POWER

BACKGROUND OF THE INVENTION

1. Field of the Invention

The present invention relates to a video-processing chip, and more particularly, to a video-processing chip with a memory storing program codes for controlling a power switch.

2. Description of the Prior Art

Digital Versatile Disc (DVD) players have become the most popular electronic audio-video apparatus today. Due to vigorous developments and lower prices of all kinds of display panels, portable audio-video apparatus get more and more popular. Hence, power consumption becomes an important condition design consideration for the portable audio-video apparatus.

Please refer to FIG. 1. FIG. 1 is a diagram of an audio-video system 10 according to the prior art. The audio-video system 10 includes an audio-video controlling device 12 and a video-processing chip 16. The video-processing chip 16 is coupled to an output end 122 of the audio-video controlling device 12 for receiving an image signal. The audio-video controlling device 12 includes a first microprocessor 111 for controlling operations of the audio-video controlling device 12. The audio-video controlling device 12 further includes an external flash memory 13A for storing program codes. The video-processing chip 16 includes a second microprocessor 17, a flash memory 13B, a scalar 39, a timing controller 38, and a first memory 14.

As shown in FIG. 1, the second microprocessor 17 is externally coupled to the video-processing chip 16. The second microprocessor 17 is an 8051 single-chip for executing some simple program codes. The flash memory 13B is externally coupled to the second microprocessor 17. The flash memory 13B is coupled to the second microprocessor for storing program codes for execution by the second microprocessor 17. The scalar 39 is used for adjusting a size of a received image. The timing controller 38 is coupled to the scalar 39. The first memory 14 is coupled to the scalar 39 for providing memory space to the scalar 39 for image processing. The video-processing chip 16 further includes an output device 19 coupled to the timing controller 38 for outputting signals that are processed by the scalar 39 and the timing controller 38. The video-processing chip 16 further includes an input device 18 coupled between the scalar 39 and the output end 122 of the audio-video controlling device 12. The input device 18 is used for receiving the image signal transmitted by the audio-video controlling device 12. The first memory 14 is a static random access memory (SRAM).

Please refer to FIG. 2 that is a diagram of another audio-video system 20 according to the prior art. The audio-video system 20 includes an audio-video controlling device 12 and a video-processing chip 26. The video-processing chip 26 is coupled to an output end 122 of the audio-video controlling device 12 for receiving an image signal and outputting the processed image signal after image processing. The audio-video controlling device 12 includes a first microprocessor 11 for controlling operations of the audio-video controlling device 12. The audio-video controlling device 12 further includes an external flash memory 13A for storing program codes. The video-processing chip 26 includes a second microprocessor 27, a flash memory 23, a scalar 39, a timing controller 38, and a first memory 14.

As shown in FIG. 2, the second microprocessor 27 is an internal component of the video-processing chip 26. The second microprocessor 27 is an 8051 single-chip for executing some simple program codes. The flash memory 23 is externally coupled to the second microprocessor 27. The flash memory 23 stores program codes for execution by the second microprocessor 27. The scalar 39 is used for adjusting a size of a received image. The timing controller 38 is coupled to the scalar 39. The first memory 14 is coupled to the scalar 39 for providing memory space to the scalar 39 for image processing. The video-processing chip 26 further includes an output device 19 coupled to the timing controller 38 for outputting signals that are processed by the scalar 39 and the timing controller 38. The video-processing chip 26 further includes an input device 18 coupled between the scalar 39 and the output end 122 of the audio-video controlling device 12. The input device 18 is used for receiving the image signal transmitted by the audio-video controlling device 12. The first memory 14 is a static random access memory (SRAM).

In the prior art, no matter whether the second microprocessor is an internal or an external component of the video-processing chip, an external flash memory 13B (as shown in FIG. 1) or flash memory 23 (as shown in FIG. 2) is needed for storing program codes of the second microprocessor 27. This external flash memory increases design cost. Furthermore, even when the audio-video system 10 or the audio-video system 20 gets into the stand-by mode, power is still supplied to the first microprocessor 11 to make sure the whole audio-video system 10 and 20 can work normally when receiving power-on commands. Due to the power not being turned off completely, the audio-video system 10 or the audio-video system 20 still consumes power.

SUMMARY OF THE INVENTION

It is therefore an object of the present invention to provide a video-processing chip, an audio-video system, and related method capable of saving power to solve the above-mentioned problems.

According to the claimed invention, a video-processing chip capable of saving power is disclosed. The video-processing chip includes a microprocessor, a scalar, a first memory, and a second memory. The microprocessor is used for executing program codes. The scalar is used for adjusting a size of a received image. The timing controller is coupled to the scalar. The first memory is coupled to the microprocessor and to the scalar for providing memory space to the scalar for image processing. The second memory is coupled to the microprocessor for storing the program codes of the microprocessor for controlling a power switch. A size of the first memory is greater than a size of the second memory.

According to the claimed invention, an audio-video system capable of saving power is disclosed. The audio-video system includes an audio-video controlling device, a flash memory, and a video-processing chip. The audio-video controlling device includes a first microprocessor. The flash memory is coupled to the audio-video controlling device. The video-processing chip includes a second microprocessor, a scalar, a timing controller, a first memory, and a second memory. The second microprocessor is used for executing program code. The scalar is used for adjusting a size of a received image. The timing controller is coupled to the scalar. The first memory is coupled to the microprocessor and to the scalar for providing memory space to the scalar for image processing. The second memory is coupled to the microprocessor for storing the program codes of the microprocessor for controlling a power switch. A size of the first memory is greater than a size of the second memory. The audio-video controlling device is a digital versatile disc player (DVD player), a digital versatile disc recorder (DVD recorder), or a television.

According to the claimed invention, a method capable of saving power in an audio-video system is disclosed. The method includes a flash memory of an audio-video controlling device transmitting program codes of a second microprocessor of a video-processing chip for controlling a power switch to a first memory when getting into a stand-by mode, and the flash memory of the audio-video controlling device transmitting program codes of the second microprocessor of the video-processing chip for executing instructions to a second memory when getting into an active mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
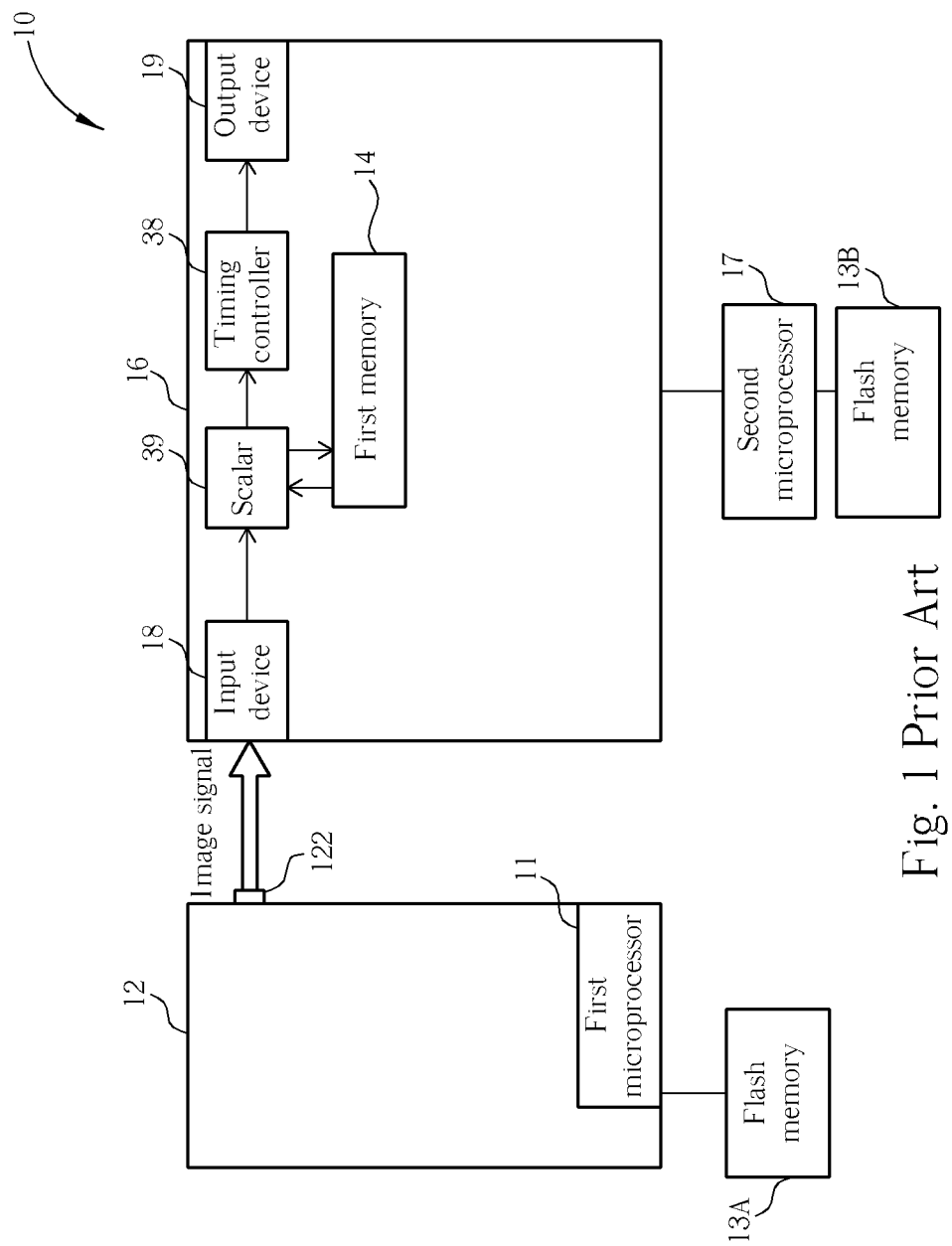
FIG. 1 is a diagram of an audio-video system according to the prior art.
Figure 2:
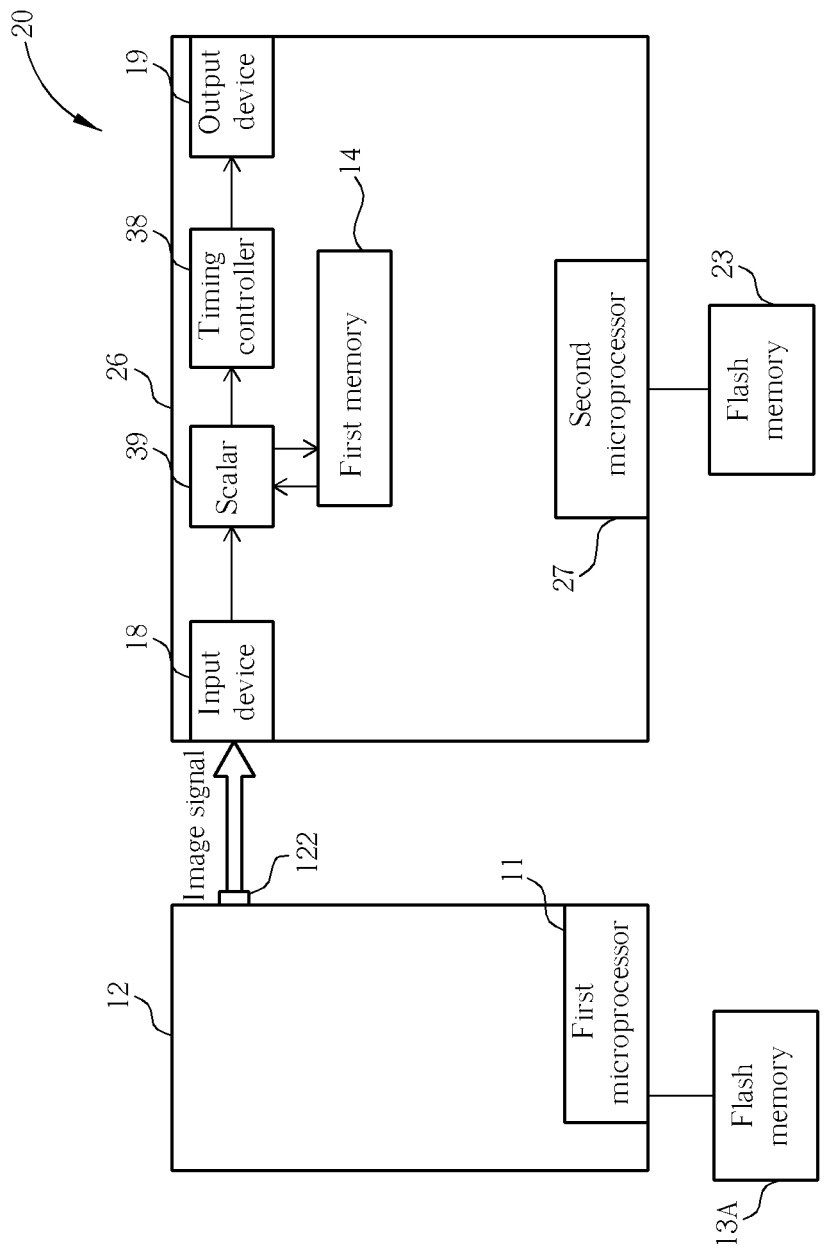
FIG. 2 is a diagram of another audio-video system according to the prior art.
Figure 3:
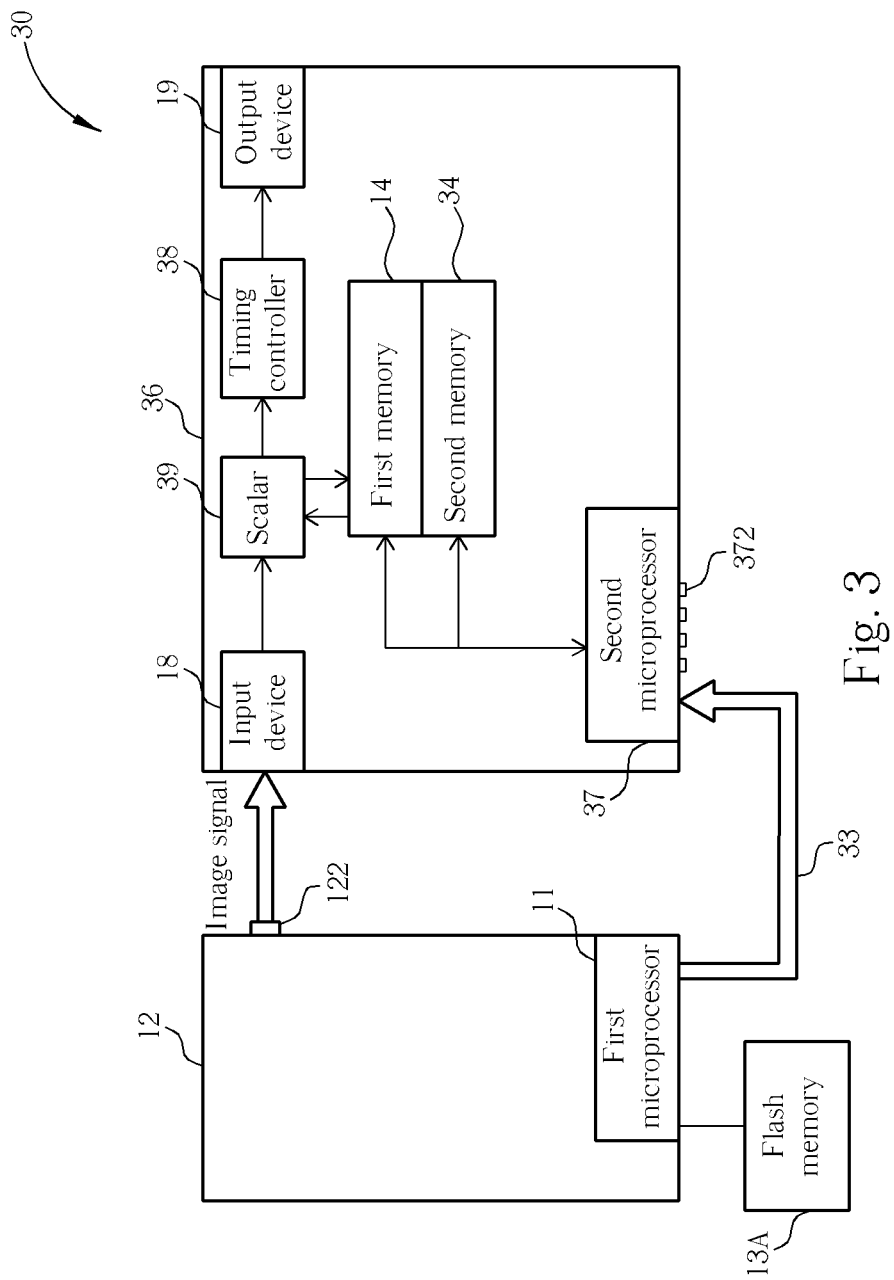
FIG. 3 is a diagram of an audio-video system according to an embodiment of the present invention.

Please refer to FIG. 3. FIG. 3 is a diagram of an audio-video system 30 according to an embodiment of the present invention. The audio-video system 30 includes an audio-video controlling device 12 and a video-processing chip 36. The video-processing chip 36 is coupled to an output end 122 of the audio-video controlling device 12 for receiving an image signal and outputting the image signal after image processing. The audio-video controlling device 12 includes a first microprocessor 11 for controlling operations of the audio-video controlling device 12. The audio-video controlling device 12 further includes an external flash memory 13A for storing program codes. The video-processing chip 36 includes a second microprocessor 37, a scalar 39, a timing controller 38, a first memory 14, and a second memory 34.

As shown in FIG. 3, the second microprocessor 37 is an internal component of the video-processing chip 36. The second microprocessor 37 is an 8051 single-chip for executing some simple program codes. The second microprocessor 37 further includes a plurality of input ports 372 as input/output expanding or controller of GPIO pins. The scalar 39 is used for adjusting a size of a received image. The timing controller 38 is coupled to the scalar 39. The first memory 14 is coupled to the second microprocessor 37 and to the scalar 39 for providing memory space to the scalar 39 for image processing. The second memory 34 is coupled to the second microprocessor 37 for storing the program codes of the microprocessor for controlling a power switch. A size of the first memory 14 is greater than a size of the second memory 34. The video-processing chip 36 further includes an output device 19 coupled to the timing controller 38 for outputting signals that are processed by the scalar 39 and the timing controller 38. The video-processing chip 36 further includes an input device 18 coupled between the scalar 39 and the output end 122 of the audio-video controlling device 12. The input device 18 is used for receiving the image signal transmitted by the audio-video controlling device 12. In one embodiment, the first memory 14 is a static random access memory (SRAM), and the second memory 34 is a static random access memory or a read only memory (ROM).

Please keep referring to FIG. 3. The second microprocessor 37 plays different roles in different power modes through the utilization of the first memory 14 and the second memory 34. The first microprocessor 11 of the audio-video controlling device 12 controls operations of the audio-video system 30 when getting into an active mode. At this time, the second microprocessor 37 plays a role of I/O expander. The first memory 14 is used for providing memory space to the scalar 39 for image processing. The second memory 34 is used for providing memory space to the second microprocessor for executing simple instructions.

Before getting into a stand-by mode, the first microprocessor 11 transmits program codes for controlling a power switch and information for encoding and decoding to the memory of the video-processing chip 36 through a serial bus interface 33. The second microprocessor 37 of the video-processing chip 36 then controls operations of the audio-video system 30. At this time, all other power of the audio-video system 30 is turned off (including the first microprocessor 11 of the audio-video controlling device 12). This saves power consumed by the audio-video controlling device 12 and makes sure that the audio-video system 30 gets into the normal stand-by mode and works correctly when receiving control commands for turning on the audio-video controlling device 12. The first memory 14 and the second memory 34 are both supplied for the usage of the second microprocessor 37. The second microprocessor 37 can execute more complicated commands such as receiving a remote signal, time power on, or receiving a control signal from users through audio-video interfaces. The above-mentioned embodiments illustrate the commands can be executed by the second microprocessor 37 but do not limit the present invention.

Figure 4:
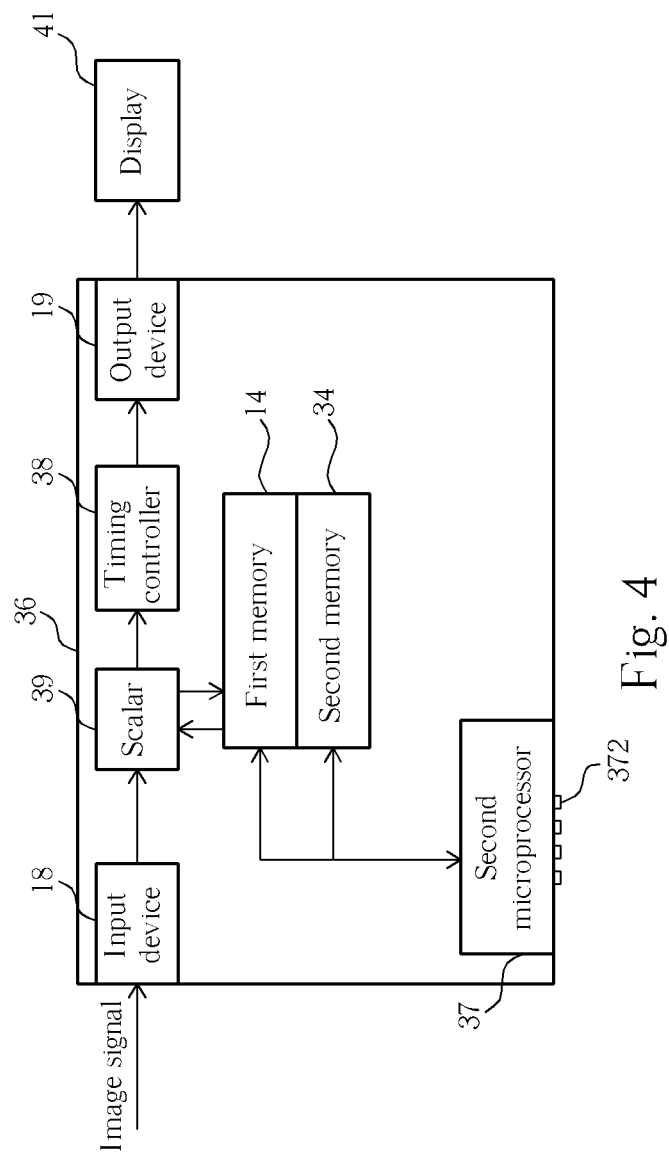
FIG. 4 is a diagram of the rear end output of the video-processing chip in FIG. 3.

Please refer to FIG. 4 and FIG. 3. FIG. 4 is a diagram of the rear end output of the video-processing chip 36 in FIG. 3. The front end of the video-processing chip 36 is coupled to the audio-video controlling device 12 for receiving the image signal. After being proceeded by the scalar 39 and by the timing controller 38, a signal is transmitted to a display 41 by the output device 19 for displaying image. In one embodiment, the display 41 may be a TFT-LCD, and the audio-video controlling device 12 may be a digital versatile disc player (DVD player), a digital versatile disc recorder (DVD recorder), or a television. A DVD system usually includes two chipsets: one is used for controlling images of DVD players (as the audio-video controlling device 12 shown in FIG. 3), and the other is used for controlling display for playing image (as the video-processing chip 36 shown in FIG. 3). Images of DVD players can be seen on the display 41 only when both of these two chipsets operate in coordination.

Figure 5:
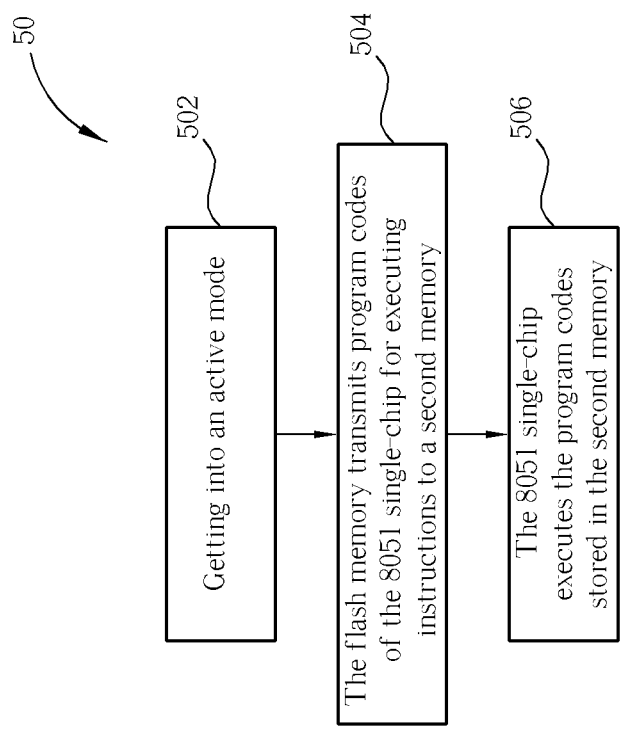
FIG. 5 is a diagram of a flow illustrating a method capable of saving power in an audio-video system according to an embodiment of the present invention.

Please refer to FIG. 5. FIG. 5 is a diagram of a flow 50 illustrating a method capable of saving power in an audio-video system according to an embodiment of the present invention. The flow 50 includes the following steps:

Step 502: Getting into an active mode.

Step 504: The flash memory 13A transmits program codes of the 8051 single-chip for executing instructions to a second memory 34.

Step 506: The 8051 single-chip executes the program codes stored in the second memory 34, wherein the 8051 single-chip is the second microprocessor 37 of the video-processing chip 36 in this embodiment.

In step 504, the first microprocessor 11 controls operations of the audio-video system 30, and the second microprocessor 37 (8051 single-chip) plays a role of I/O expander. The second memory 34 is used for providing memory space to the second microprocessor 37 (8051 single-chip) for executing simple instructions. Hence, the flash memory 13A transmits program codes of the 8051 single-chip to the second memory 34.

Figure 6:
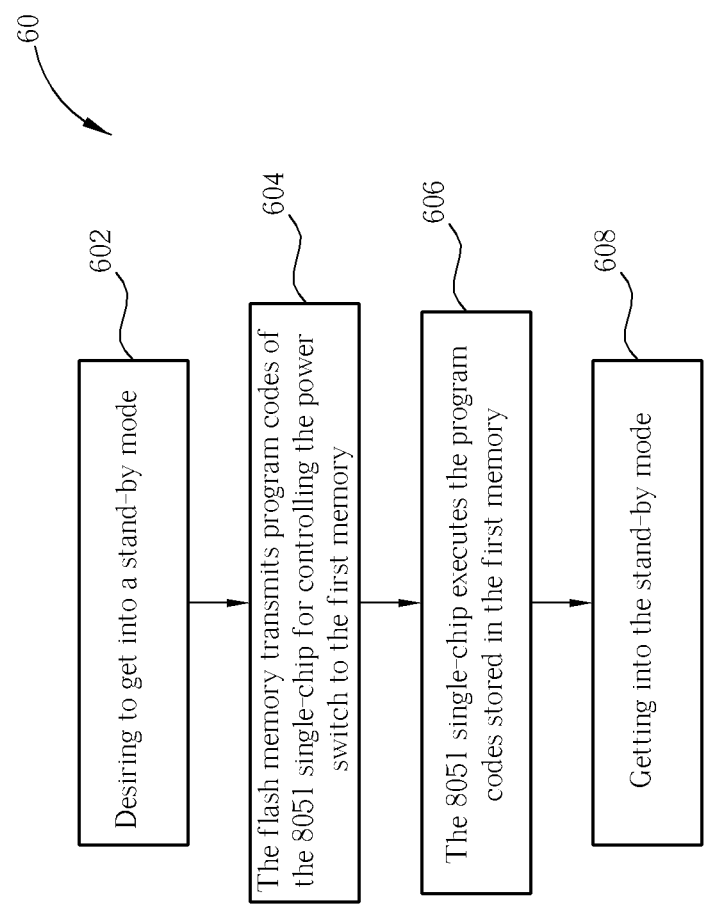
FIG. 6 is a diagram of a flow illustrating a method capable of saving power in an audio-video system according to another embodiment the present invention.

Please refer to FIG. 6. FIG. 6 is a diagram of a flow 60 illustrating the method capable of saving power in an audio-video system according to another embodiment of the present invention. The flow 60 includes the following steps:

Step 602: Desiring to get into a stand-by mode.

Step 604: The flash memory 13A transmits program codes of the 8051 single-chip to the first memory.

Step 606: The 8051 single-chip executes the program codes stored in the first memory.

Step 608: Getting into the stand-by mode.

In step 604, the flash memory 13A transmits program codes for controlling the power switch or information for encoding and decoding to the first memory through the serial bus interface 33. The second microprocessor 37 controls operations of the audio-video system 30. That is, the first microprocessor 11 transmits program codes for controlling the power switch or information for encoding and decoding to the memory of the video-processing chip 36. And then the 8051 single-chip is executed to control operations of the audio-video system 30. At this time, the first memory 14 is supplied for the 8051 single-chip. So that, the 8051 single-chip can execute more complicated commands.

The above-mentioned embodiments illustrate but do not limit the present invention. The first memory 14 and the second memory 34 are not restricted to two memories and in fact the memory is uncountable. In other embodiments, the first and the second memory 14 and 34 can be two areas in just one memory. The second microprocessor 37 is not restricted to an 8051 single-chip only, and can be another component. The usage of the 8051 single-chip is widespread and not restricted to I/O expander only. Furthermore, the second memory 34 is not limited to RAM or ROM only, but can be another type of memory.

In conclusion, the present invention provides a video-processing chip 36 with a memory storing program codes of microprocessors for controlling a power switch. The second microprocessor 37 plays different roles in different power modes through the utilization of the first memory 14 and the second memory 34. The second microprocessor 37 controls operations of the audio-video system 30 when getting into the stand-by mode. At this time, all the other power of the audio-video system 30 is turned off. This saves power consumed by the audio-video controlling device 12 and makes sure that the audio-video system 30 gets into the normal stand-by mode and works correctly when receiving control commands for turning on the audio-video controlling device 12. The first memory 14 is supplied for the usage of the second microprocessor 37. The second microprocessor 37 can execute more complicated commands. The second microprocessor 37 plays a role of I/O expander when getting into the active mode, which increasing the number of input/output ports. Furthermore, the utility rate of the first memory 14 and the second memory 34 is raised, preventing a need for an external flash memory 23 and saving cost. The present invention can be applied in a small sized TFT-LCD where power consumption becomes one of the most important conditions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video-processing chip capable of saving power comprising:
    a microprocessor for executing program codes;
    a scalar for adjusting a size of a received image;
    a first memory coupled to the microprocessor and the scalar for providing memory space for the scalar for image processing; and
    a second memory coupled to the microprocessor storing the program codes of the microprocessor for controlling a power switch to turn off power to a microprocessor external to the video-processing chip.

2. The video-processing chip of claim 1 wherein a size of the first memory is greater than a size of the second memory.

3. The video-processing chip of claim 1 further comprising a timing controller coupled to the scalar.

4. The video-processing chip of claim 3 further comprising an output device coupled to the timing controller for outputting signals that are processed by the scalar and the timing controller.

5. The video-processing chip of claim 1 further comprising an input device coupled to an input end of the scalar for receiving an image signal.

6. The video-processing chip of claim 1 wherein the microprocessor is an 8051 single-chip.

7. The video-processing chip of claim 1 wherein the microprocessor includes a plurality of input ports and output ports.

8. The video-processing chip of claim 1 wherein the first memory is a static random access memory (SRAM).

9. The video-processing chip of claim 1 wherein the second memory is a static random access memory.

10. The video-processing chip of claim 1 wherein the second memory is a read only memory (ROM).

11. An audio-video system capable of saving power comprising:
    an audio-video controlling device comprising a first microprocessor;
    a flash memory coupled to the audio-video controlling device; and
    a video-processing chip coupled to receive output of the audio-video controlling device comprising:
        a second microprocessor for executing program codes;
        a scalar for adjusting a size of a received image;
        a first memory coupled to the second microprocessor and the scalar for providing memory space for the scalar for image processing; and
        a second memory coupled to the second microprocessor for receiving program codes of the second microprocessor from the flash memory for controlling a power switch to turn off power to the first microprocessor.

12. The audio-video system of claim 11 wherein a size of the first memory is greater than a size of the second memory.

13. The audio-video system of claim 11 further comprising a serial bus interface coupled between the first microprocessor and the second microprocessor for transmitting instructions.

14. The audio-video system of claim 11 further comprising a timing controller coupled to the scalar.

15. The audio-video system of claim 14 further comprising an output device coupled to the timing controller for outputting signals that are processed by the scalar and the timing controller.

16. The audio-video system of claim 11 further comprising an input device coupled to an input end of the scalar for receiving an image signal.

17. The audio-video system of claim 11 wherein the second microprocessor is an 8051 single-chip.

18. The audio-video system of claim 11 wherein the second microprocessor includes a plurality of input ports and output ports.

19. The audio-video system of claim 11 wherein the first memory is a static random access memory.

20. The audio-video system of claim 11 wherein the second memory is a static random access memory.

21. The audio-video system of claim 11 wherein the second memory is a read only memory.

22. The audio-video system of claim 11 wherein the audio-video controlling device is a digital versatile disc player (DVD player).

23. The audio-video system of claim 11 wherein the audio-video controlling device is a digital versatile disc recorder (DVD recorder).

24. The audio-video system of claim 11 wherein the audio-video controlling device is a television.

25. A method capable of saving power in an audio-video system, the audio-video system comprising an audio-video controlling device having a first microprocessor and a flash memory storing codes for controlling the audio-video system and a video processing chip having an on-chip second microprocessor and first memory, the method comprising:

the first microprocessor transmitting program codes for controlling a power switch from the flash memory to the first memory; and the second microprocessor executing the codes stored in the first memory to turn off power to the first microprocessor when getting into a stand-by mode.

26. The method of claim 25 further comprising:

the flash memory of the audio-video controlling device transmitting program codes of the second microprocessor of the video-processing chip for executing instructions to a second memory when getting into an active mode.

27. The method of claim 26 further comprising:

the flash memory of the audio-video controlling device transmitting program codes of the second microprocessor of the video-processing chip for controlling the power switch to the second memory when getting into the stand-by mode.

28. The method of claim 27 further comprising:

the second microprocessor of the video-processing chip executing the program codes stored in the second memory.

29. The method of claim 25 further comprising:

the second microprocessor of the video-processing chip executing the program codes stored in the first memory for receiving a remote signal, time power on, or receiving a control signal from users through audio-video interfaces.

30. The method of claim 25 further comprising:

a first microprocessor of the audio-video controlling device used for controlling operations of the audio-video system when getting into the active mode.

31. The method of claim 25 further comprising:

the second microprocessor of the video-processing chip used for controlling operations of the audio-video system when getting into the stand-by mode.

* * * * *